June 11, 1963 E. G. JANSSEN, JR 3,093,234
ARTICLE REARRANGING APPARATUS
Filed Sept. 27, 1961 3 Sheets-Sheet 1

INVENTOR.
EDMUND G. JANSSEN, JR.
BY Fredrick H. Braun
ATTORNEY

June 11, 1963   E. G. JANSSEN, JR   3,093,234
ARTICLE REARRANGING APPARATUS
Filed Sept. 27, 1961   3 Sheets-Sheet 2

INVENTOR.
EDMUND G. JANSSEN, JR.
BY Fredrick H. Braun
ATTORNEY

June 11, 1963 E. G. JANSSEN, JR 3,093,234
ARTICLE REARRANGING APPARATUS
Filed Sept. 27, 1961 3 Sheets-Sheet 3

INVENTOR
EDMUND G. JANSSEN, JR.

BY Fredrick H. Braun

ATTORNEY

United States Patent Office 3,093,234
Patented June 11, 1963

3,093,234
ARTICLE REARRANGING APPARATUS
Edmund G. Janssen, Jr., Colerain Township, Hamilton County, Ohio, assignor to The Procter & Gamble Company, Cincinnati, Ohio, a corporation of Ohio
Filed Sept. 27, 1961, Ser. No. 141,124
3 Claims. (Cl. 198—34)

This invention relates to an apparatus for rearranging articles received from a first conveying means into groups of articles on a second conveying means. More particularly, the apparatus is devised to receive individual articles moving in spaced relationship on a first conveyor and automatically deposit them on a second conveyor in spaced groups wherein each group is composed of two or more articles.

It is a common merchandising practice today to sell articles in groups of two or more so that the average price per article is somewhat less than the price if sold singly. This practice is frequently used to induce purchasers to try new and/or different products. Usually, the articles are individually packaged and the individual packages are glued or taped together in the manner described, for example, in U.S. Patent 2,925,946 issued to J. F. Graver. The resultant composite package is actually composed of a plurality of individual packages making it relatively expensive and more costly to handle than if the group of articles were packaged as a group in a single wrapper or container. Heretofore, this latter possibility has been difficult to achieve in many areas since most of the commercially available packaging machines are very difficult to modify to simultaneously wrap two or more articles in a single package.

The wrapping machine disclosed in the pending application of Charles R. Hood, Serial Number 126,998, filed on July 26, 1961, was found to be easily modified to simultaneously wrap two or more articles. The only problem created in order to accomplish this was the provision of an automatic device for arranging the articles so that they can be fed to the packaging machine in groups. It was, therefore, necessary to invent an apparatus which would regroup individual articles moving in spaced relationship on a conveyor, into spaced groups of two or more articles which could then be simultaneously wrapped in a single package by the aforesaid wrapping machine.

The principal object of this invention is the provision of an automatic device for moving uniformly spaced products of any shape from a first conveying device to a second conveying device where they are deposited in groups to two or more articles for movement to a station where the articles will be further processed or packaged in groups.

Another object of the invention is the provision of an apparatus for accomplishing the aforesaid purpose which can be operated continuously and at relatively high speeds such as 300 or more articles per minute although the apparatus is also capable of satisfactory operation at slower speeds if necessary.

A further object of the invention is the provision of an apparatus as aforesaid which is capable of performing the function outlined above at the indicated speeds without damaging or marring products which have deformable and/or soft surfaces such as bars of soap, decorated collapsible tubes, printed cartons, and the like.

Still a further object of the invention is the provision of a rearranging apparatus which is capable of operating continuously and reliably without requiring a great deal of attention from the operator and one that is compatible with changes in speed of operation.

Briefly stated, the invention in one embodiment is composed of means for receiving and transferring individual articles received in single file order from an infeed conveyor; the aforementioned means include a plurality of pairs of receiver blocks which are moved in unison and are adapted to hold and convey the individual articles; each pair of receiver blocks are moved in unison by their respective supporting arms in timed sequence to the infeed conveyor; the receiver blocks receive and hold each article as it is moved to an article carrier secured to and being moved by a take-away conveyor; the articles are deposited in groups of two or more in the carrier; the pairs of receiver blocks move in different paths depending on the number of articles in each group so that each pair of arms in a set moves an article and deposits it side-by-side in the carrier of the take-away conveyor until a group of articles of predetermined number has been formed.

While the specification concludes with claims particularly pointing out and distinctly claiming the subject matter regarded as forming the present invention, it is believed the invention will be better understood from the following description taken in connection with the accompanying drawings in which:

The present invention will be described in handling bars of soap since it has been successfully developed and used for this purpose. It will be understood, however, that any commerically available article can be handled by this apparatus including collapsible tubes, cartons, and the like. The reference to bars of soap in the following description is not to be construed as limiting the invention in any way. Such reference is made merely for convenience and will be understood by those skilled in the art as being merely exemplary of the various kinds of articles that can be handled.

Figures 1, 2:
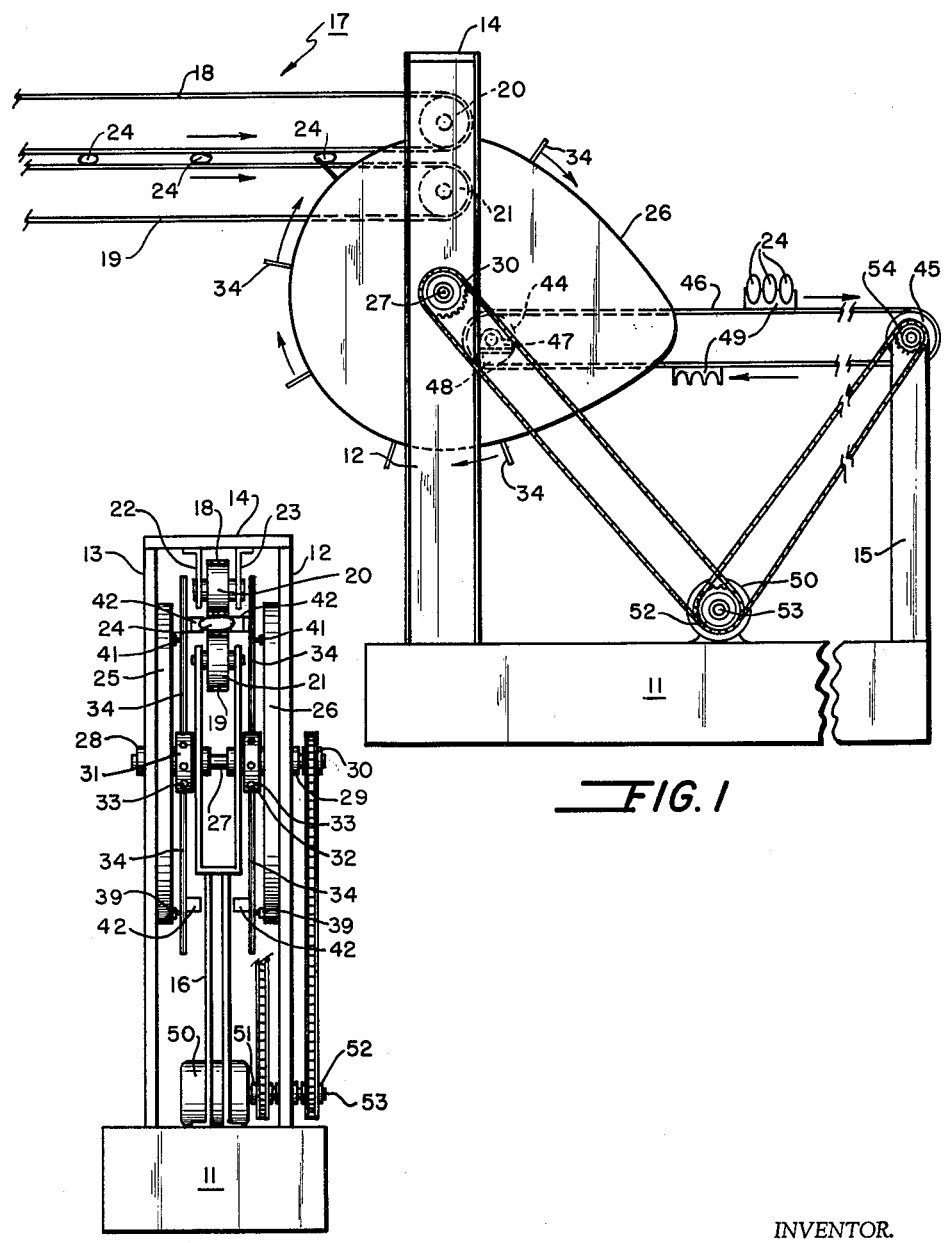
FIGURE 1 is a side elevation of the apparatus with the infeed conveyor broken away.
FIGURE 2 is an end elevation of the apparatus taken from the left side of FIGURE 1.

Referring now to the drawings, and particularly FIGURES 1 and 2, the apparatus described is supported by a base plate 11. The main supporting frame is composed of the vertical support members 12 and 13 which are joined together at the top by the member 14. A support member 15 is provided at the other end of the apparatus and an inner frame 16 is mounted on the base plate 11 as shown in FIGURE 2.

The infeed conveyor shown generally at 17 is used to deliver the articles in single file order to the apparatus as illustrated in FIGURE 1. The infeed conveyor includes an upper belt 18 and a lower belt 19. The belts are supported at one end by the idler pulleys 20 and 21, respectively. The idler pulley 20 is journaled in the brackets 22 and 23 (FIGURE 2) attached to the member 14. The idler pulley 21 is journaled in the upper portion of the inner frame member 16 as illustrated in FIGURE 2. While the infeed conveyor belts are broken off as shown in FIGURE 1, it will be understood by those skilled in the art that they will be supported by a pair of drive pulleys (not shown) in conventional fashion. Preferably, the belts 18 and 19 are moved at substantially constant speed and are faced with a resilient high friction surface so that the bars of soap 24 will be positively fed at substantially constant spacing.

Figure 3:
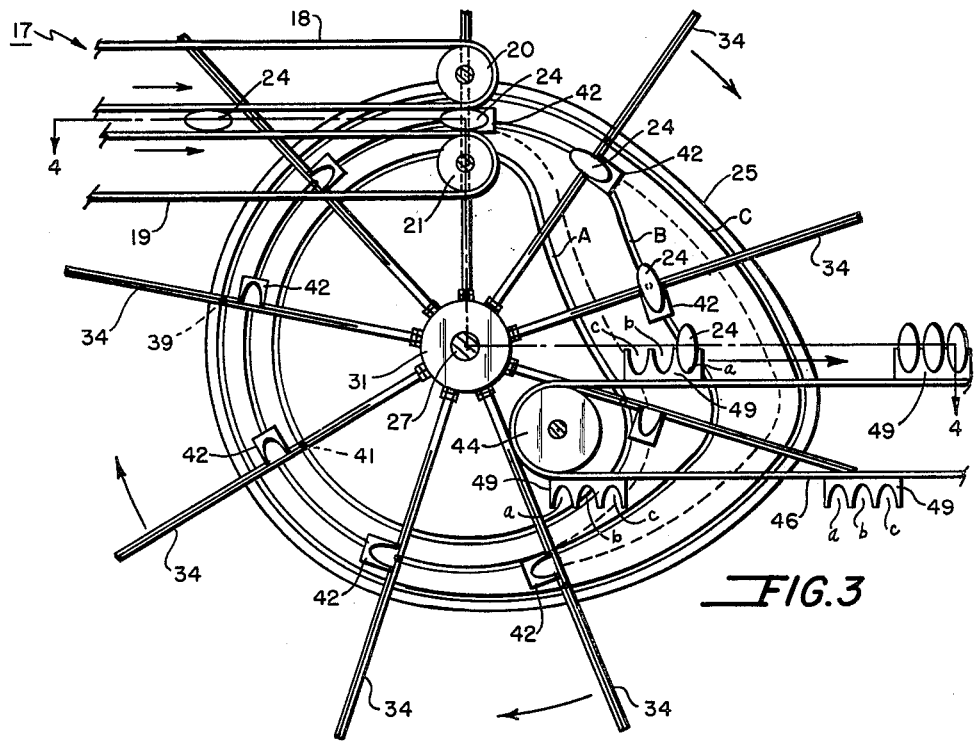
FIGURE 3 is a fragmentary elevation taken in section through the center of the apparatus showing several cam tracks and the receiver blocks which are actuated thereby.
Figure 4:
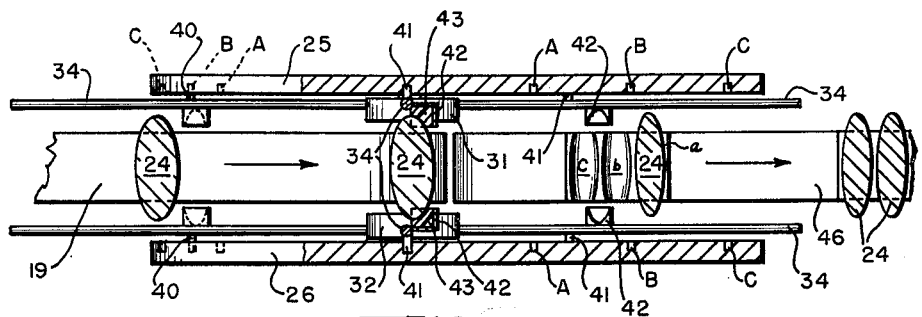
FIGURE 4 is a plan view looking down on the apparatus along the lines 4—4 of FIGURE 3.

A pair of stationary face cams 25 and 26 are attached to the vertical support members 12 and 13. As illustrated in FIGURE 3, the cam 25 is provided with 3 circuitous cam tracks which are indicated as A, B and C for convenience. The other cam 26 is of similar configuration having the same number of mirror image cam tracks (not shown) as the tracks A, B and C.

The main shaft 27 is journaled in the bearings 28 and 29. The main shaft 27 has a drive sprocket 30 keyed to one end. Spacer rings 31 and 32 are secured to the shaft 27 and each is provided with a plurality of radial openings 33 to receive the hollow arm members 34. As illustrated in FIGURE 3, a plurality of equally spaced arm members 34 are provided as it is necessary to provide at least as many arm members as there are articles in the group to be collected. The total number of arm members may then be multiplied by any integer for more effective and efficient operation. In the present illustration, nine equally spaced arm members 34 are provided on each spacer ring 31 and 32. This figure is arrived at by multiplying the number of articles to be grouped, 3, by an integer, 3, although any other integer could be used. The spacer rings 31 and 32 are so mounted that each arm 34 secured to the ring 31 is parallel to and axially spaced from an arm member 34 secured to the ring 32 whereby a plurality of pairs of arms 34 are formed (see FIGURE 5).

Figure 5:
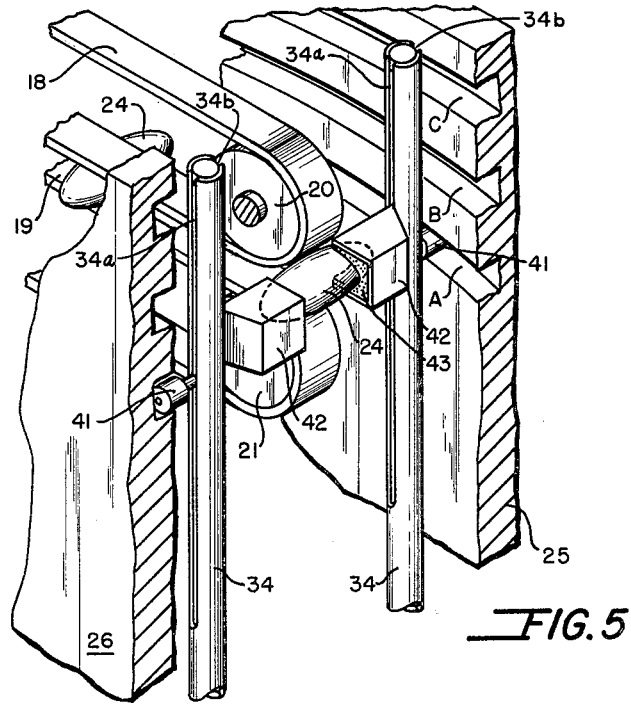
FIGURE 5 is a fragmentary isometric view, partially in cross section, showing the manner in which an article is moved from the infeed conveyor to a pair of receiver blocks.
Figure 6:
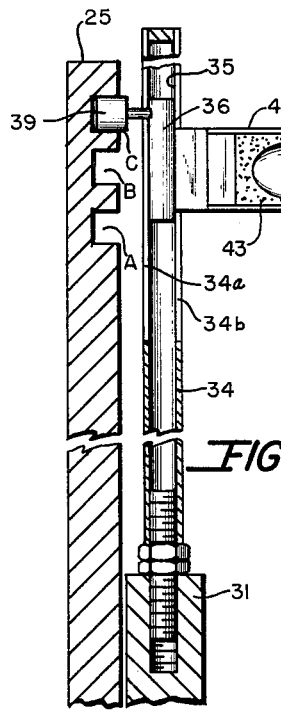
FIGURES 6, 7 and 8 are fragmentary elevations, partially in cross section, showing a portion of the stationary cam, the arms, guide members and cam followers which control the movement of the receiver blocks.
Figure 7:
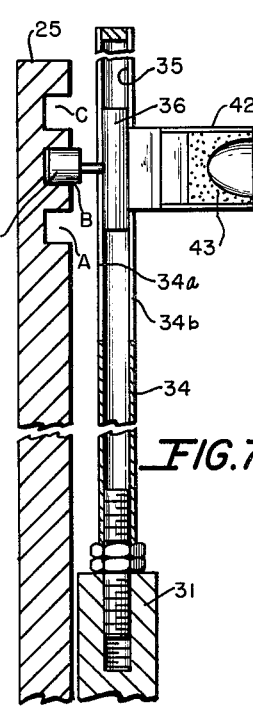
Figure 8:
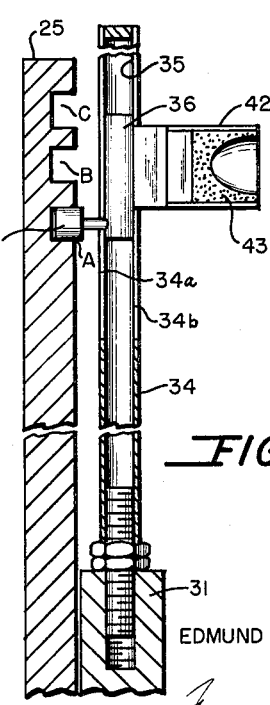

The arm members 34 are each provided with a radially movable guide within the hollow portion of the arm member. As illustrated in FIGURES 6, 7, and 8, the hollow 35 in the arm members 34 have the guides 36, 37 and 38 mounted therein. The guide 36 (FIGURE 6) has a cam follower 39 which rides in the track C. Similarly, the guides 37 and 38 have followers 40 and 41 which ride in the tracks B and A respectively. The arms 34 are slitted at 34a and 34b (FIGURE 5) in order to permit the guides 36, 37 and 38 to be moved radially due to changes in the shape of cam tracks A, B and C.

Each of the guides has a receiver block 42 attached thereto. Preferably, a resilient cushion 43 (FIGURES 4, 6, 7 and 8) made from foam rubber, foam plastic or the like is provided in each receiver block 42 so that the article will not be damaged. It will be noted that the cam followers 39, 40 and 41 are located at a different relative radial position with respect to the receiver blocks 42 in each of FIGURES 6, 7 and 8. The purpose of this will be appreciated when viewing FIGURE 3 since it will be seen that the bars of soap are delivered at the same height to the receiver blocks 42 whereas the position of deposit of the bars in carriers 49 must vary depending upon which track (A, B or C) it is following.

The take-away conveyor is composed of the sprockets 44 and 45 which have the endless chain 46 passing around them. The sprocket 44 is journaled in the bearing 47 (FIGURE 1) supported on the bracket 48 which is attached to the inner frame 16. A similar bearing and bracket (not shown) supports the sprocket 44 on the other side. The sprocket 45 is supported for rotation by the member 15. The chain 46 is provided with one or more spaced carriers 49 having article receiving recesses designated for convenience a, b and c.

The take-away conveyor and the receiver blocks attached to the arms 34 are driven in timed relationship by the motive power source which in this instance is illustrated as an electric motor 50 secured to the base plate 11. As shown in FIGURE 2, the motor 50 has the drive sprockets 51 and 52 keyed to its output shaft 53. The sprocket 51 drives the sprocket 54 attached to a common shaft with the sprocket 45. The sprocket 52 drives the sprocket 30 previously described. Thus the main shaft 27 and the take-away conveyor are driven in timed sequence and at substantially constant speed.

The operation of the device will now be described. The bars of soap 24 being fed to the apparatus by the infeed conveyor are received by a pair of receiver blocks 42 supported by the arms 34 (FIGURE 5). The receiver blocks 42 are moved at a somewhat lesser speed as compared to the bars 24 which are moved in timed relationship on the infeed conveyor 17. As a result, the bars 24 are positively moved into each pair of receiver blocks 42. The first bar in the group to be formed is received by a pair of receiver blocks 42 attached to guides 38 having their followers 41 riding in cam tracks A. As the arms 34 are moved by rotation of main shaft 27, the receiver blocks 42 deposit the bar of soap 24 in the moving pocket a (FIGURE 4) of the article carrier 49 due to the shape of the cam track A and the timed movement of the article carrier 49. The next bar of soap on the infeed conveyor is received by a pair of receiver blocks 42 whose guides 37 are radially moved by followers 40 riding in the cam tracks B. Movement of the supporting arms 34 causes the receiver blocks 42 to deposit the bar of soap in the pocket b of the article carrier 49 which has been moved into proper position due to the timed movement of the chain 46 (FIGURE 3). Similarly, a third bar 24 is received by the next pair of receiver blocks 42 and deposited in the pocket c due to the shape of the cam track C. The group of three bars 24 are then conveyed to the next station where they may be wrapped or otherwise handled.

The process is then repeated as the next set of arms 34 move past the infeed conveyor and the corresponding guides 38, 37 and 36 are moved radially by the cam tracks A, B and C to deposit the bars in the pockets a, b and c of the next carrier 49.

It will, of course, be apparent that variations in the invention are possible permitting the collection of any number of articles in a group merely by changing the number of cam tracks to correspond with the number of articles to be grouped and by providing receiver blocks having the proper number of recesses. Thus, it is possible to group articles of any size or shape automatically merely by making simple changes that are well within the skill of the ordinary worker in the art.

It is also possible to operate the device in opposite direction to that described. This will result in uniformly spacing articles which are initially fed to the apparatus in spaced groups of two or more. For example, if the described apparatus were operated in reverse, the bars of soap on the carrier 49 would be picked up in order and deposited on the conveyor 17 where they would be carried off in uniformly spaced relation.

While a particular embodiment of the invention has been illustrated and described it will be obvious to those skilled in the art that various changes and modifications can be made without departing from the spirit and scope of the invention and it is intended to cover in the appended claims all such changes and modifications that are within the scope of this invention.

What is claimed as new is:

1. Apparatus for arranging equally spaced articles received in single file order into groups composed of at least two articles comprising means for receiving and positively holding each article as received from an infeed conveyor, said means including a plurality of pairs of receiver blocks, each receiver block of each pair being mounted for radial movement in a supporting arm, means for moving said supporting arms in timed relationship with said infeed conveyor, a plurality of article carriers mounted in spaced relationship on a take-away conveyor, each of said article carriers having at least two closely spaced article supporting recesses, said supporting arms being moved in timed relationship with said article carriers so that successive pairs of arms deliver articles in sequence to each recess of each article carrier whereby a plurality of groups of articles are formed.

2. Apparatus for arranging equally spaced articles received in single file order into groups composed of at least two articles comprising a supporting frame, an infeed conveyor for delivering articles in substantially equal spacing to said apparatus, a take-away conveyor mounted on said frame, said take-away conveyor supporting a plurality of equally spaced article carriers each having at least two closely spaced article supporting recesses, a pair of stationary plate cams mounted on said frame, each cam having at least two tracks, a plurality of pairs of equally spaced arms mounted for pivotal movement so that their axis of rotation is within said cam tracks, each of said arms having a receiver block mounted for radial movement therein, said receiver blocks having cam followers which ride in said tracks of said cams so that said receiver blocks act in pairs to receive articles from said infeed conveyor and deliver them to said recesses in said article carriers thereby forming said articles into groups.

3. Apparatus for arranging equally spaced articles received in single file order into groups composed of at least two articles comprising a supporting frame, an infeed conveyor for delivering articles in substantially equal spacing to said apparatus, a take-away conveyor mounted on said frame, said take-away conveyor supporting a plurality of equally spaced article carriers each having at least two closely spaced article supporting recesses, a pair of stationary plate cams mounted on said frame, each cam having at least two tracks, a plurality of pairs of equally spaced hollow arms mounted for pivotal movement so that their axis of rotation is within said cam tracks, each of said arms having a receiver block including a guide mounted for radial movement within said arm, each of said guides having a cam follower engaging one of said cam tracks so that said receiver blocks act in pairs to receive articles from said infeed conveyor and deliver them to said recesses in said article carriers thereby forming said articles into groups.

References Cited in the file of this patent
UNITED STATES PATENTS

| | | |
|---|---|---|
| 2,609,911 | Davis | Sept. 9, 1952 |
| 2,805,755 | Jones | Sept. 10, 1957 |